(12) United States Patent
Liu

(10) Patent No.: US 10,894,450 B2
(45) Date of Patent: Jan. 19, 2021

(54) STATE CONTROL METHOD, TIRE PRESSURE MONITORING DEVICE AND SYSTEM

(71) Applicant: Silergy Semiconductor Technology (Hangzhou) LTD, Hangzhou (CN)

(72) Inventor: Chikang Liu, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 10 days.

(21) Appl. No.: 16/273,326

(22) Filed: Feb. 12, 2019

(65) Prior Publication Data
US 2019/0299724 A1 Oct. 3, 2019

(30) Foreign Application Priority Data

Mar. 29, 2018 (CN) .......................... 2018 1 0273072

(51) Int. Cl.
*B60C 23/00* (2006.01)
*B60C 23/04* (2006.01)
(52) U.S. Cl.
CPC ...... *B60C 23/0422* (2013.01); *B60C 23/0474* (2013.01)
(58) Field of Classification Search
CPC .................. B60C 23/0422; B60C 23/0474
USPC ........................................................ 340/443
See application file for complete search history.

(56) References Cited

U.S. PATENT DOCUMENTS

| 3,872,268 | A | * | 3/1975 | Hata | ................... | B60C 23/0425 |
| | | | | | | 200/61.22 |
| 4,157,530 | A | * | 6/1979 | Merz | ..................... | B60C 23/007 |
| | | | | | | 200/61.25 |
| 5,469,136 | A | * | 11/1995 | Matsubara | .......... | B60C 23/0425 |
| | | | | | | 200/61.25 |
| 5,526,861 | A | * | 6/1996 | Oshita | ................. | B60C 23/0408 |
| | | | | | | 152/415 |
| 5,924,055 | A | * | 7/1999 | Hattori | ............... | B60C 23/0401 |
| | | | | | | 702/138 |
| 6,166,698 | A | | 12/2000 | Turnbull et al. | | |
| 6,854,335 | B1 | * | 2/2005 | Burns | ................. | B60C 23/0425 |
| | | | | | | 73/728 |
| 7,224,267 | B1 | | 5/2007 | Ellis | | |
| 7,392,119 | B2 | * | 6/2008 | Allard | ................. | B60C 23/0416 |
| | | | | | | 340/445 |
| 7,446,525 | B2 | * | 11/2008 | Pullini | ............... | B60C 23/0425 |
| | | | | | | 324/207.21 |
| 8,095,333 | B2 | | 1/2012 | Penot et al. | | |
| 8,421,612 | B2 | | 4/2013 | Sugiura | | |
| 8,922,359 | B2 | | 12/2014 | Lim | | |
| 9,420,408 | B2 | | 8/2016 | Liu | | |
| 2003/0093188 | A1 | * | 5/2003 | Morita | ................... | F16C 41/008 |
| | | | | | | 701/1 |

(Continued)

FOREIGN PATENT DOCUMENTS

CN 102862450 A 1/2013

*Primary Examiner* — Ojiako K Nwugo
(74) *Attorney, Agent, or Firm* — Michael C. Stephens, Jr.

(57) ABSTRACT

A tire pressure monitoring device can include: a magnetic sensor configured to measure a first magnetic field intensity in a first direction, and to measure second magnetic field intensity in a second direction; and a controller configured to control a state of the tire pressure monitoring device based on a variation of the first magnetic field intensity and a variation of the second magnetic field intensity.

18 Claims, 8 Drawing Sheets

(56) References Cited

U.S. PATENT DOCUMENTS

| | | | |
|---|---|---|---|
| 2003/0201882 A1* | 10/2003 | Moore | H04L 12/40032 340/445 |
| 2005/0174109 A1* | 8/2005 | Pullini | B60C 23/0425 324/207.23 |
| 2006/0212193 A1* | 9/2006 | Breed | B60C 23/0425 701/33.7 |
| 2006/0214780 A1* | 9/2006 | Mathias | B60C 23/0416 340/442 |
| 2007/0030162 A1* | 2/2007 | Okada | G01P 3/443 340/682 |
| 2007/0068240 A1* | 3/2007 | Watabe | B60C 23/0462 73/146.5 |
| 2007/0090934 A1* | 4/2007 | Knittl | B60G 17/01933 340/444 |
| 2007/0193349 A1* | 8/2007 | Petrucelli | B60C 23/0408 73/146.8 |
| 2009/0102636 A1 | 4/2009 | Tranchina | |
| 2011/0205047 A1 | 8/2011 | Patel et al. | |
| 2011/0254760 A1* | 10/2011 | Lloyd | G06F 3/038 345/156 |
| 2012/0128357 A1* | 5/2012 | Mukai | H04L 12/12 398/58 |
| 2013/0093545 A1* | 4/2013 | Rajula | H01H 9/041 335/207 |
| 2016/0292669 A1* | 10/2016 | Tunnell | H04W 4/70 |
| 2017/0153297 A1* | 6/2017 | Kauter | G01R 33/07 |
| 2017/0282655 A1 | 10/2017 | Liu et al. | |
| 2017/0334253 A1* | 11/2017 | Chuang | B60C 23/041 |
| 2018/0023977 A1* | 1/2018 | Park | G01D 5/145 324/207.2 |
| 2018/0184376 A1* | 6/2018 | Geerlings | G01R 33/072 |
| 2018/0321282 A1* | 11/2018 | Hurwitz | G01R 15/207 |

* cited by examiner

STATE CONTROL METHOD, TIRE PRESSURE MONITORING DEVICE AND SYSTEM

RELATED APPLICATIONS

This application claims the benefit of Chinese Patent Application No. 201810273072.1, filed on Mar. 29, 2018, which is incorporated herein by reference in its entirety.

FIELD OF THE INVENTION

The present invention generally relates to the field of automotive electronics technology, and more particularly state control methods, tire pressure monitoring devices, and associated systems.

BACKGROUND

Tire pressure monitoring systems (TPMS) can be used to monitor the status of tires by recording the tire speed or by use of electronic sensors in the tires, in order to provide effective safety for the driving of motor vehicles. In one approach, an indirect tire pressure monitoring system can be used to determine whether the tire pressure is normal by the rotating speed difference. In another approach, a direct tire pressure monitoring system can utilize air pressure monitoring and temperature sensors in the tires. The air pressure and temperature of the tires may be monitored when the motor vehicles are driving or stationary. Alarms may go off when the tires are in a dangerous state (e.g., high pressure, low pressure, high temperature, etc.), in order to avoid potential traffic accidents caused thereby.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A tire pressure monitoring system (TPMS) may be used to monitor tire pressure and maintain proper pressure, which can play an important role in ensuring the driving safety of vehicles. In a tire pressure monitoring system, a sensor for detecting the tire pressure may be placed in the tire, in order to transmit the detected tire pressure to the vehicle's data processor for monitoring and prompting.

In one embodiment, a tire pressure monitoring device can include: (i) a magnetic sensor configured to measure a first magnetic field intensity in a first direction, and to measure second magnetic field intensity in a second direction; and (ii) a controller configured to control a state of the tire pressure monitoring device based on a variation of the first magnetic field intensity and a variation of the second magnetic field intensity.

Figure 1:
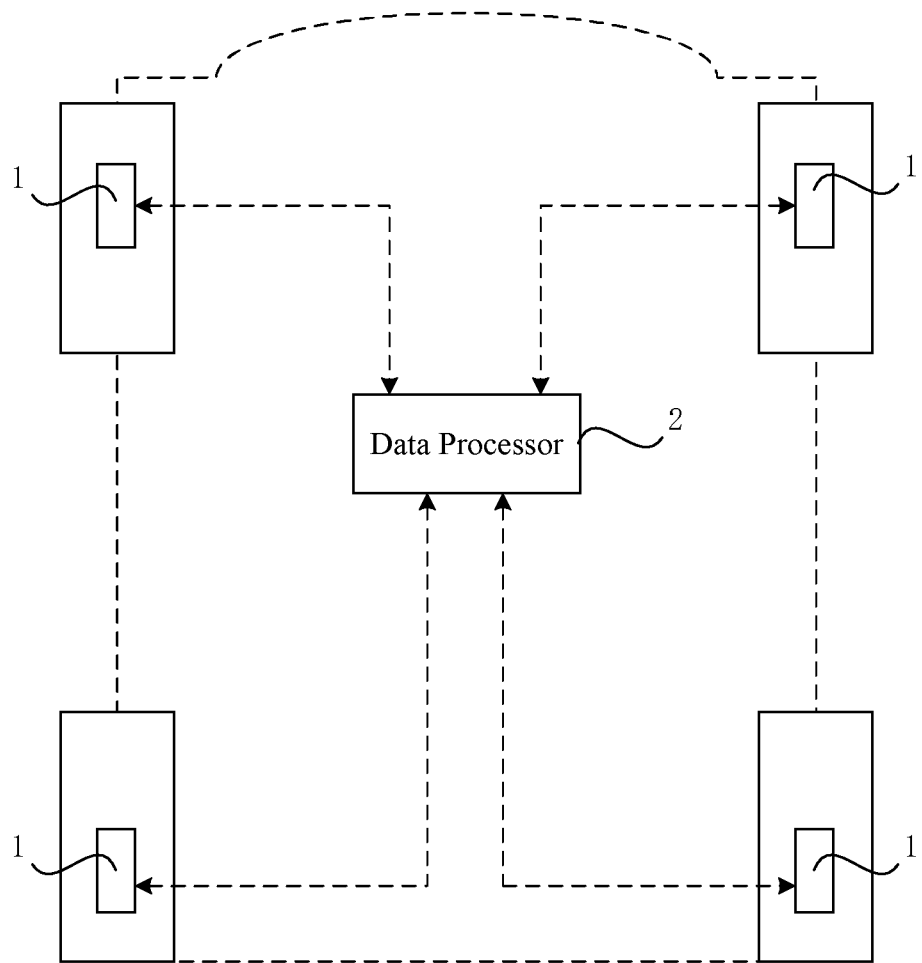
FIG. 1 is a schematic block diagram of an example tire pressure monitoring system.

Referring now to FIG. 1, shown is a schematic block diagram of an example tire pressure monitoring system. In this example, the TPMS can include tire pressure monitoring device 1 placed in the tire, and data processor 2 placed in a vehicle control system. Since tire pressure monitoring device 1 may need to be powered by a battery, the power consumption of tire pressure monitoring device 1 should be reduced as much as possible, in order to avoid disassembling the tire frequently for battery replacement. Tire pressure monitoring device 1 can be controlled to be in a sleep state with low power consumption when the tire is still, and to wake up when the tire is rotating. This approach may reduce power consumption and also ensure the safety of the vehicle when in a moving state.

However, if the rotation state of the tire is detected by an acceleration sensor, the acceleration sensor can malfunction due to severe impacts that the tire encounters during operation because it contains movable elements. In addition, the technique of detecting the rotation state of the tire by a magnetic sensor can be limited by the accuracy of the magnetic sensor itself and the installation direction. As a result, the state of the tire pressure monitoring device may not be accurately controlled.

Figure 2:
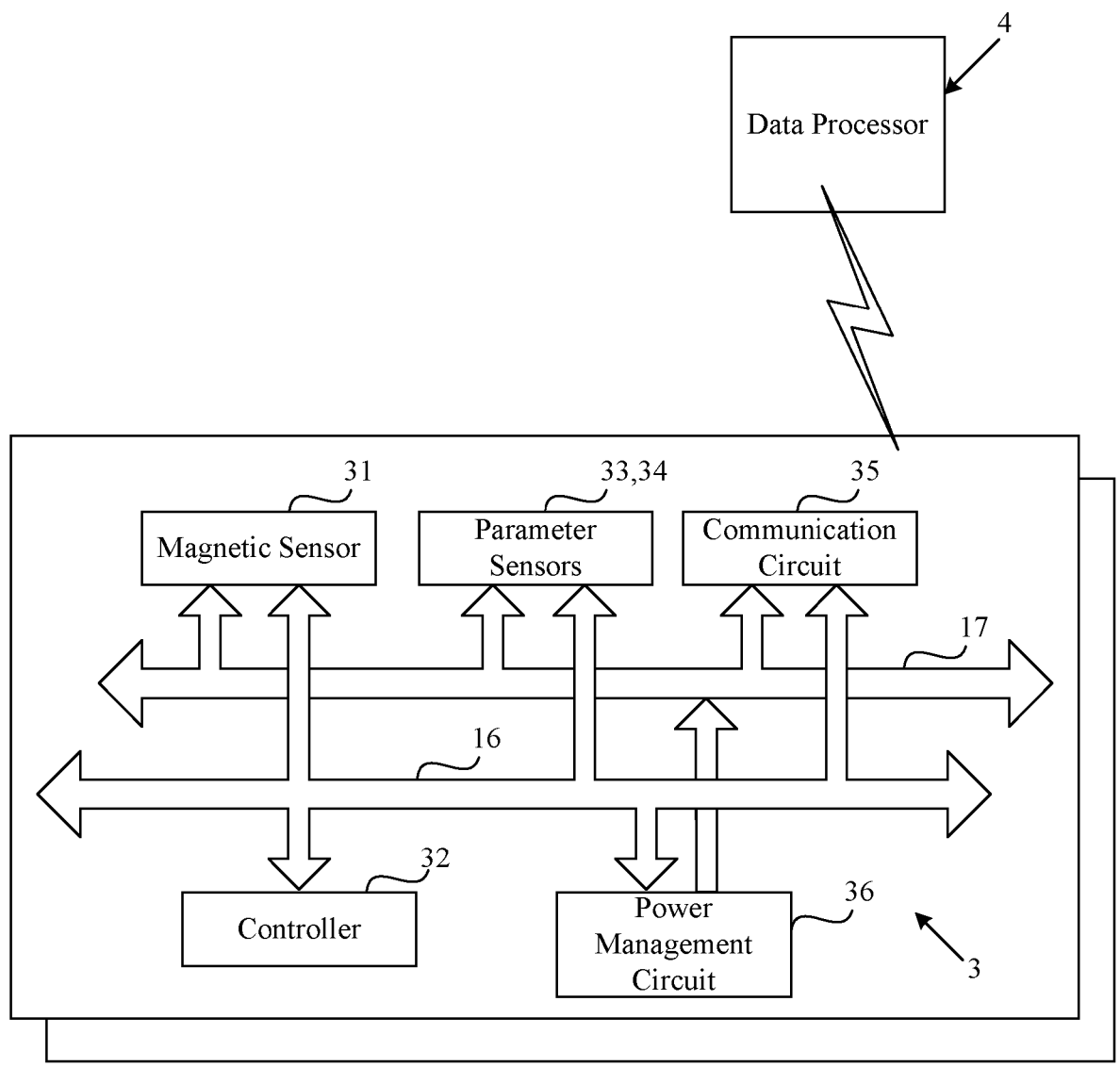
FIG. 2 is a schematic block diagram of an example tire pressure monitoring system, in accordance with embodiments of the present invention.
Figure 3:
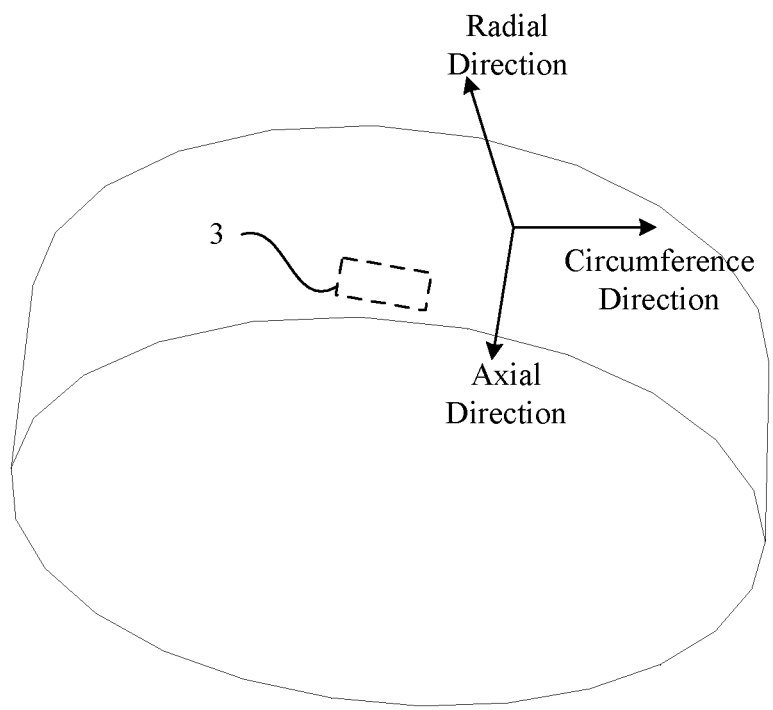
FIG. 3 is a schematic block diagram of an example installation for a tire pressure monitoring device, in accordance with embodiments of the present invention.

Referring now to FIG. 2, shown is a schematic block diagram of an example tire pressure monitoring system, in accordance with embodiments of the present invention. Referring also to FIG. 3, shown is a schematic block diagram of an example installation for a tire pressure monitoring device, in accordance with embodiments of the present invention. In this example, the tire pressure monitoring system can include at least one tire pressure monitoring device 3 and data processor 4. Each tire pressure monitoring device 3 can be installed in the tire. For example, tire pressure monitoring device 3 can be installed on the circumferential surface of the hub of the tire, as shown is FIG. 3, so as to be stably fixed and in good contact with the inflated portion of the tire for detecting parameter information of the given portion. Data processor 4 may be in communication with each tire pressure monitoring device 3, such that the uploaded pressure information and other tire parameter information (e.g., temperature, battery voltage, etc.) can be received from tire pressure monitoring device 3, and presented to the driver through a human-machine interface after further processing.

In this particular example, tire pressure monitoring device 3 can include magnetic sensor 31 and controller 32. Further, tire pressure monitoring device 3 can also include parameter sensors for detecting tire parameters, such as pressure sensor 33, temperature sensor 34, etc., as well as communication circuit 35 and power management circuit 36. Magnetic sensor 31, pressure sensor 33, and temperature sensor 34 can be coupled to controller 32 by a separate signal line or a universal signal bus. Controller 32 can be implemented by any suitable control circuit (e.g., an application specific integrated circuit (ASIC), a digital signal processor (DSP), a digital signal processing device (DSPD), a programmable logic device (PLD), a field programmable gate array (FPGA), a single chip microcomputer, etc.). Also, communication circuit 35 can include a wireless communication component.

Magnetic sensor 31 (e.g., a magnetometer) can be configured as a coil with a magnetic core disposed in a particular direction. Magnetic sensor 31 can produce a signal proportional to the variation of the magnetic flux passing through the coil according to Lenz's law. Also, if the magnetic flux passing through the coil changes greatly and/or quickly, the signal is relatively large. For example, magnetic sensor 31 can be made of anisotropic magneto resistance (AMR) material, and the resistance value may vary along with the change of the induced magnetic field. The geomagnetic field, like a strip magnet, points from the south magnetic pole to the north magnetic pole. The magnetic field at the magnetic poles is perpendicular to the local horizontal plane, and the magnetic field at the equator is parallel to the local horizontal plane, so the direction of the magnetic field in the northern hemisphere is tilted to the ground. The geomagnetic field is a vector that can be decomposed into two components parallel to the local horizontal plane and one component perpendicular to the local horizontal plane for a fixed location. The magnetic sensor is simultaneously in the geomagnetic field and in the environmental magnetic field formed by the electronic circuit of the vehicle and ferromagnetic body and the like.

Figure 4:
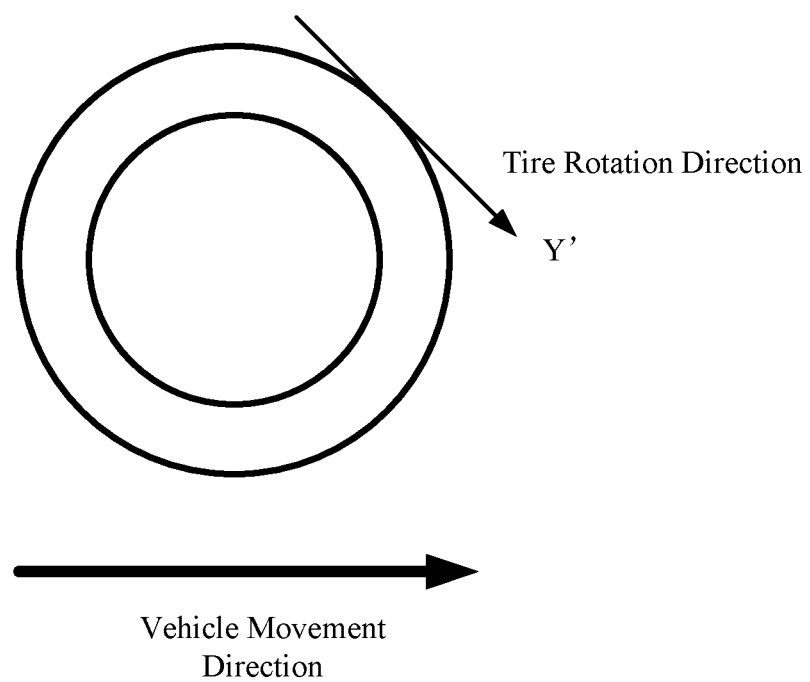
FIG. 4 is a schematic block diagram of an example tire rotation direction, in accordance with embodiments of the present invention.

Referring now to FIG. 4, shown is a schematic block diagram of an example tire rotation direction, in accordance with embodiments of the present invention. When magnetic sensor 31 rotates to a different position with the tire, the relative orientation of magnetic sensor 31 with the external magnetic field is different, such that the measured magnetic field intensity in a specific direction also changes accordingly. This can be detected by the magnetic sensor, thereby producing a varying measurement value of the magnetic field intensity. By detecting the variation of the magnetic field intensity, whether the tire is rotating can be sensed.

However, the accuracy of the Hall magnetic sensor is relatively poor, and is generally about 0.5 mV/V/G. When a voltage of 1 V is applied to the Hall magnetic sensor, the change per Gauss is 0.05 mV. The magnetic variation of the rotation for 180° is about 0.35 Gauss, and the noise value of the general circuit is close to this variation. Therefore, when the vehicle is running, the tire pressure monitoring device using the Hall magnetic sensor may not detect the enough change of the magnetic induction intensity due to the rotation of the tire. This can result in an inability to switch the operating state of the tire pressure monitoring device in time. Also, when the tire rotates, the change of the radial magnetic field intensity component and the circumferential magnetic field intensity component of the tire are relatively large, and the axial magnetic field intensity of the tire may not substantially change.

In addition, some high-precision sensors, such as Z-axis AMR magnetic sensors, have larger dimensions in the direction of the measuring axis, and may need a special manufacturing process. Thus, grooves that are up to hundreds of microns deep and at a certain angle, may need to be made on the silicon wafer, or the silicon wafer may need to be erected during packaging, thereby causing reliability problems of the sensors due to the high-speed rotation of the tire. Therefore, such sensors may not be suitable to be placed in a tire to measure the change of the radial magnetic field, in order to ensure that the tire pressure monitoring device is designed as flat as possible. Also, a single-axis planar magnetic sensor with the sensitivity of about 0.5 mV/V/G, may often be set with the measuring axis aligned with the circumferential direction and the axial direction, respectively.

Determining whether the tire is rotating in this arrangement involves determining a change of the magnetic field intensity as measured in the circumferential direction. Furthermore, due to the different installation processes of tire pressure monitoring devices, the measuring axis of the magnetic sensor may not be accurately aligned with the circumferential direction and the axial direction after the installation is completed. In particular, some external tire pressure monitoring devices are screwed to the inflation nozzle of the tire, which requires rotating the tire pressure monitoring device to a completely airtight position, and the final direction of the tire pressure monitoring device may have a certain randomness.

However, controller 32 may not adjust the magnitude of the change in the magnetic field caused by the randomness after the installation is completed. Therefore, the rotation state of the tire may not be detected normally, and the operating state may not be switched normally. In this particular example, magnetic sensor 31 is a two-axis planar sensor that can measure magnetic field intensities B1 and B2 in two directions perpendicular to each other (first direction X and second direction Y). First direction X and second direction Y are located on a tangent plane of the circumferential surface of the tire.

Figure 5:
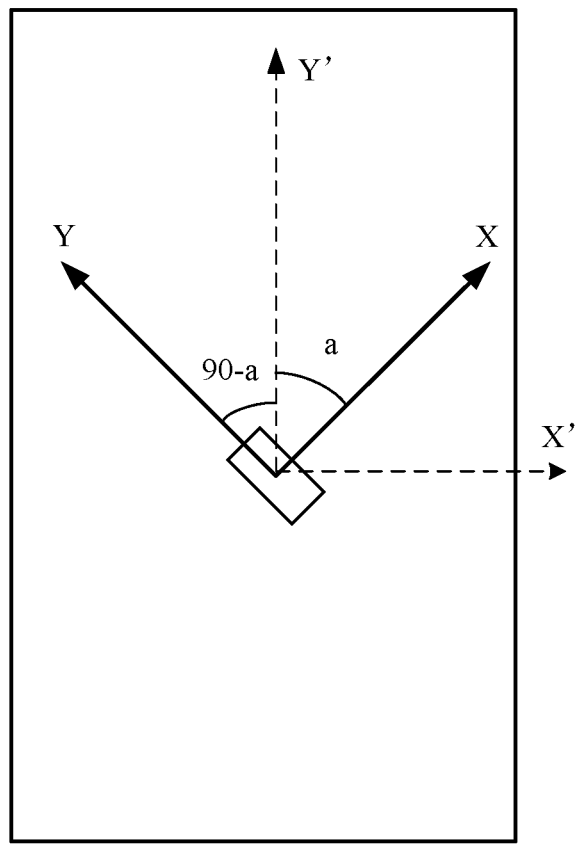
FIG. 5 is a schematic block diagram of an example magnetic detection direction for a tire pressure monitoring device, in accordance with embodiments of the present invention.

Referring now to FIG. 5, shown is a schematic block diagram of an example magnetic detection direction for a tire pressure monitoring device, in accordance with embodiments of the present invention. In this particular example, when the tire pressure monitoring device is installed in the tire in a random manner, first direction X and second direction Y of the measuring axis of magnetic sensor 31 may point to any direction of the tangent plane. As shown, the angle between first direction X and circumferential direction Y' (the rotational direction of the tire) is 'a', and the angle between second direction Y and circumferential direction Y' is 90−a. Thus, the variation of the magnetic field intensity in the rotational direction of the tire can be expressed by the sum of the projected value of the variation of the magnetic field intensity measured in first direction X in circumferential direction Y' and the projected value of the variation of the magnetic field intensity measured in second direction Y in circumferential direction Y'. That is, circumferential magnetic field intensity By' can be expressed as below in (1).

$$By' = B1 * \cos(a) + B2 * \cos(90-a). \tag{1}$$

Considering axial magnetic field intensity Bx', magnetic field intensity B1 detected by magnetic sensor 31 in first direction X can be expressed as below in (2).

$$B1 = By'^* \cos(a) + Bx'^* \sin(a). \tag{2}$$

Correspondingly, magnetic field intensity B2 detected by magnetic sensor 31 in second direction Y can be expressed as below in (3).

$$B2 = By'^* \sin(a) - Bx'^* \cos(a). \tag{3}$$

When the tire rotates, circumferential magnetic field intensity By' changes by ΔBy', while axial magnetic field intensity Bx' remains substantially unchanged, and magnetic field intensities B1 and B2 detected by magnetic sensor 31 can satisfy the following formulas (4) and (5), respectively.

$$B1 = (By' + \Delta By')^* \cos(a) + Bx'^* \sin(a) \tag{4}$$

$$B2 = (By' + \Delta By')^* \sin(a) - Bx'^* \cos(a) \tag{5}$$

The variation of magnetic field intensities B1 and B2 can be expressed as below in (6) and (7), respectively.

$$\Delta B1 = \Delta By'^* \cos(a) \tag{6}$$

$$\Delta B2 = \Delta By'^* \sin(a) \tag{7}$$

Thus, a value equal to or approximately characterizing the variation of the circumferential magnetic field intensity can be obtained based on the variation of magnetic field intensities B1 and B2. In this example, controller 32 can control the state of the tire pressure monitoring device in accordance with variation ΔB1 of magnetic field intensity B1 and variation ΔB2 of magnetic field intensity B2. Therefore, a relatively accurate representation value of the change in the circumferential magnetic field can be obtained regardless of the change in the installation angle, such that the detection for the operating state of the tire pressure monitoring device may not be affected by the installation angle, thereby maintaining relatively high accuracy.

For example, controller 32 can acquire a parameter characterizing the variation of the circumferential magnetic field intensity based on variation ΔB1 of magnetic field intensity B1 and variation ΔB2 of magnetic field intensity B2. Controller 32 can control the state of the tire pressure monitoring device based on the parameter characterizing the variation of the circumferential magnetic field intensity.

In one example, since |sin(a)|+|cos(a)| is a number with a minimum of 1 and a maximum of no more than 1.5, the sum of the absolute values of variation ΔB1 and ΔB2 in the magnetic field intensity can be used as the parameter approximately characterizing the variation of circumferential magnetic field intensity By'. The error of the circumferential magnetic field intensity may not be greater than 0.5 regardless of the change in the angle 'a', and the difference between the maximum and minimum values of the magnetic field intensity may be greater than 50% when the tire rotates one turn. Thus, the sum of the absolute values of the variation ΔB1 and ΔB2 in the magnetic field intensity can effectively detect the rotation of the tire. Although a certain accuracy may be lost by utilizing the summation calculation to approximately characterize the variation of the magnetic field intensity, a lower cost controller can be used to better monitor the real-time performance of the rotation state of the tire, since the summation calculation requires fewer computational resources.

In another example, since $[\sin(a)]^2 + [\cos(a)]^2 = 1$, the sum of squares of the variation ΔB1 and ΔB2 in the magnetic field intensity can be used to accurately characterize the variation of circumferential magnetic field intensity By'. Therefore, the change of the magnetic field can be detected more accurately, thereby more accurately detecting the rotation state of the tire, and substantially eliminating the negative influence of the installation angle on the detection. It should be understood that, in addition to the above implementations, other methods may be used to characterize the variation of the circumferential magnetic field intensity in particular embodiments, such as a weighted sum or a square root of the sum of squares of the variation ΔB1 and ΔB2 in magnetic field intensity.

For example, the directions (the first direction and the second direction) that the two measuring axes of magnetic sensor 31 point to may not necessarily be perpendicular with respect to each other. As long as the angle of the two measuring axes is a fixed predetermined angle, the parameter charactering the variation of the magnetic field intensity in the tire circumferential direction can be obtained based on the variation of the magnetic field intensity in both directions. Therefore, in other examples, the measuring axes of magnetic sensors 31 can be at a predetermined angle that is not zero with respect to each other. For example, the predetermined angle may be within a range from 30° to 90°.

For example, when the sum of the absolute values or the sum of the squares of the variation of the magnetic field intensity is greater than a threshold, the tire pressure monitoring device can be controlled by controller 32 to switch to an operating or enabled state. When the average of the sum of the absolute values or the sum of squares within a determination period is less than the threshold, the tire pressure monitoring device can be controlled to switch to a sleep or disabled state. In the operating state, communication component 35 can be controlled by controller 32 to report tire parameter information to data processor 4 every short first period (e.g., about 3 minutes) to ensure continuous monitoring of the tire condition and to ensure safe driving of the vehicle. In the sleep state, communication circuit 35 can be controlled by controller 32 to extend the period for reporting, and to report the tire parameter information to data processor 4 every long second period (e.g., about 30 minutes). In this way, the number of reporting times can be reduced, which can reduce the power consumption of the tire pressure monitoring device and prolong the service life.

Therefore, controller 32 can accurately make the tire pressure monitoring device start or sleep according to the tire state based on the variation of the magnetic field intensity in the two directions detected by the two-axis magnetic sensor 31, thereby improving operating performance without affecting power consumption. Controller 32 may also reduce the power consumption in the sleep state by adjusting the detection period of each parameter sensor in different states. Controller 32 can also control the parameter sensor to collect tire parameter information for a shorter third period (e.g., about 5 seconds) in an operating state, and for a longer fourth period in a sleep state (e.g., about 10 seconds). Controller 32 can also directly report the tire parameter information in real time when the tire pressure or other parameters are abnormal, and report the abnormal information in time.

Figure 6:
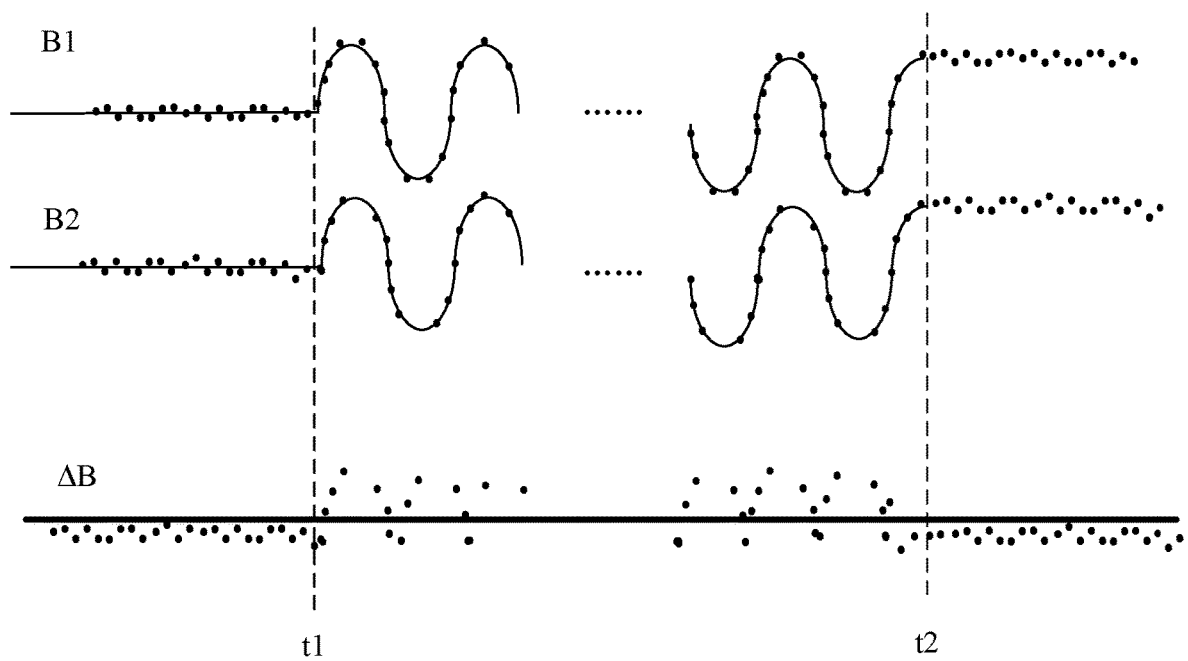
FIG. 6 is a waveform diagram of example operation of a tire pressure monitoring device, in accordance with embodiments of the present invention.

Referring now to FIG. 6, shown is a waveform diagram of example operation of a tire pressure monitoring device, in accordance with embodiments of the present invention. This particular example is obtained by simulation when the measuring axis of magnetic sensor 31 is 45° from the tire circumferential direction. Before time t1, the tire is in a stationary state, and the magnetic field intensities B1 and B2 can both be maintained at about a constant value. In addition, the sum ΔB of the absolute values of the variation of the magnetic field intensities B1 and B2 may be less than a predetermined threshold. The tire can continue to rotate between time t1 and time t2, and the magnetic field intensities B1 and B2 may periodically fluctuate. As described above, since the magnetic field in the axial direction is substantially constant, the change trends of the magnetic field intensities B1 and B2 can be substantially the same.

Also, the sum ΔB of the absolute values corresponding to the variation of the magnetic field intensities B1 and B2 may also vary along with the change in the magnetic field intensity. After time t2, the tire can return to the stationary state, and the magnetic field intensities B1 and B2 can be constant near a new constant value (e.g., as determined by the position of the tire). In addition, the sum ΔB of the absolute values of the variation of the magnetic field intensities B1 and B2 may also return to below a predetermined threshold. Thus, whether the tire is rotating can be determined more accurately by comparing the sum value and the threshold value, then whether to switch the state of the tire pressure monitoring device can be determined further.

Figure 7:
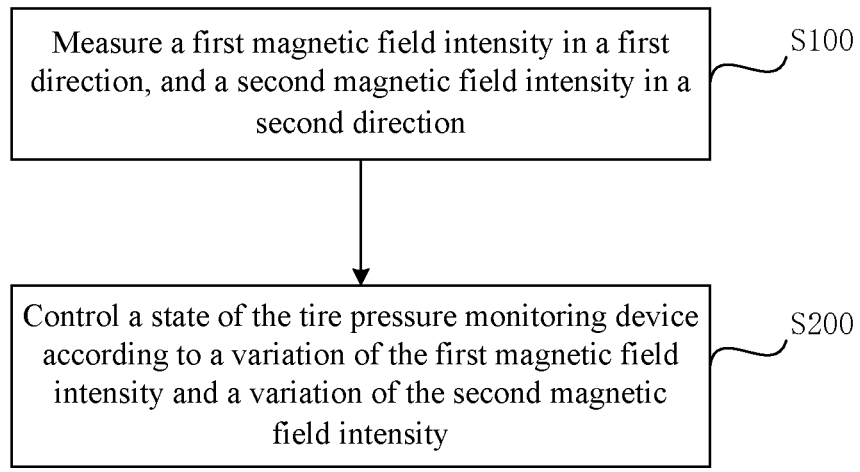
FIG. 7 is a flow diagram of an example state control method, in accordance with embodiments of the present invention.

Referring now to FIG. 7, shown is a flow diagram of an example state control method, in accordance with embodiments of the present invention. In this example, at S100, a first magnetic field intensity in a first direction, and a second magnetic field intensity in a second direction, can be measured. For example, the first and second directions are any two directions on the tangent plane of the circumferential surface of the tire that form a predetermined angle with respect to each other. In this particular example, the predetermined angle may be within a range of from about 30° to about 90°.

In S200, a state of the tire pressure monitoring device can be controlled according to variation of the first magnetic field intensity and variation of the second magnetic field intensity. In addition, S200 can also include acquiring a parameter characterizing a variation of a circumferential magnetic field intensity of a tire according to the variation of the first and second magnetic field intensities. Further, S200 can also include controlling the state of the tire pressure monitoring device according to the parameter. For example, the parameter is the sum of absolute values, or the sum of squares of the variation, of the first and second magnetic field intensities.

Controlling the state of the tire pressure monitoring device according to the parameter can include controlling the tire pressure monitoring device to switch to an operating state when the parameter is greater than a threshold. The tire pressure monitoring device can also be controlled to switch to a sleep state when an average of the parameter in a judging period is less than the threshold. In cases whereby the variation of the magnetic field intensity detected by the two-axis magnetic sensor in the direction of two measuring axes is used as a basis for judging the change of the magnetic field intensity, the rotation state of the tire can be accurately obtained without being limited by the installing angle. Also, based on the precise control of the state of the tire pressure monitoring device, the performance of the tire pressure monitoring system may be improved while also reducing power consumption and prolonging service life.

Figure 8:
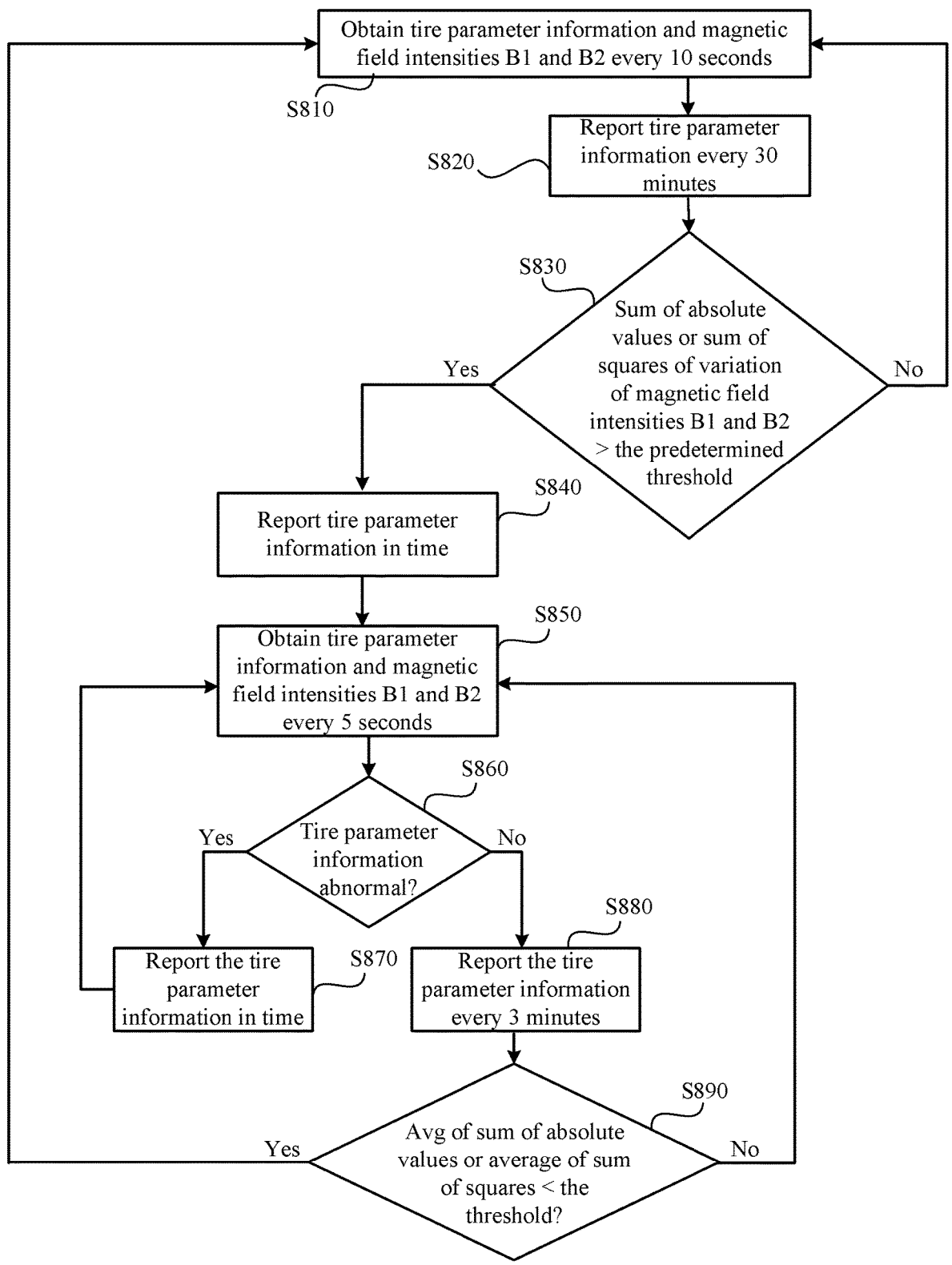
FIG. 8 is a flow diagram of example control of a tire pressure monitoring device, in accordance with embodiments of the present invention.

Referring now to FIG. 8, shown is a flow diagram of example control of a tire pressure monitoring device, in accordance with embodiments of the present invention. In this particular example, at S810, the parameter sensor can be controlled, e.g., every 10 seconds (the fourth period) to measure the tire parameter information, and the magnetic sensor can be controlled to obtain the information on the magnetic field intensity. At S820, the communication circuit can be controlled, e.g., every 30 minutes (the second period) to report the tire parameter information (e.g., information on pressure, temperature, battery voltage, etc.).

At S830, if the sum of the absolute values or the sum of the squares of the variation of magnetic field intensity B1 and magnetic field intensity B2 is greater than the predetermined threshold, S840 can be performed, and otherwise S810 is performed again. Then in S840, the communication circuit can be controlled to report the tire parameter information. At S850, in the operating state, the parameter sensor can be controlled, e.g., every 5 seconds (the third period) to measure the tire parameter information and the magnetic sensor may be controlled to obtain the information on the magnetic field intensity.

At S860, if the tire parameter information is abnormal, S870 may be performed, and otherwise S880 is performed. At S870, the abnormal tire parameter information is reported in time, and then S850 is performed again. At S880, the communication circuit can be controlled to report the tire parameter information, e.g., every 3 minutes (the first period). At S890, if the average of the sum of the absolute values or the average of the sum of the squares of the variation of magnetic field intensities B1 and B2 in a predetermined period is less than the predetermined threshold, S801 may be performed again, and otherwise the operating state can be maintained and then S850 performed. The time that is less than the threshold may last for, e.g., 10 minutes before returning to S810.

It should be understood that, the periods (e.g., the first and second periods) during which the tire parameter information is reported in different states can be set according to the particular application and the battery capacity, as long as the first period is less than the second period. Similarly, the periods (e.g., the third and fourth periods) during which the tire parameter information is collected in different states can also be set according to the particular application and the battery capacity, as long as the third period is less than the fourth period.

In particular embodiments, the report of the tire parameter information and the switching of the operating state can be accurately controlled, such that the accuracy and the performance of the tire pressure monitoring system can be improved while reducing the power consumption and prolonging the service life of the tire pressure monitoring device. Also in particular embodiments, a storage medium that is a non-transitory computer readable storage medium including instructions may be provided, such that the instructions can be executed by a processor in order to perform the methods described above. For example, the non-transitory computer readable storage medium may be a read-only memory (ROM), a random access memory (RAM), a CD-ROM, a magnetic tape, a floppy disk, an optical data storage device, or any other suitable storage device/medium.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. A tire pressure monitoring device, comprising:
 a) a magnetic sensor having a first measuring axis configured to measure a first magnetic field intensity in a first direction, and a second measuring axis configured to measure a second magnetic field intensity in a second direction, wherein said first and second magnetic field intensities are measured at a same time and for a certain tire position; and b) a controller configured to control a state of said tire pressure monitoring device based on a variation of said first magnetic field intensity and a variation of said second magnetic field intensity.

2. The tire pressure monitoring device of claim 1, wherein a predetermined angle between said first and second directions is within a range of from 30° to 90°.

3. The tire pressure monitoring device of claim 2, wherein said first direction and said second direction are two directions with said predetermined angle on a tangent plane of a tire circumferential surface.

4. The tire pressure monitoring device of claim 1, wherein said controller is configured to obtain a parameter characterizing variation of a magnetic field intensity in a tire circumferential direction according to said variation of said first magnetic field intensity and said variation of said second magnetic field intensity, and to control said state of said tire pressure monitoring device according to said parameter.

5. The tire pressure monitoring device of claim 4, wherein said parameter is configured as the sum of absolute values or the sum of squares of said variation of said first magnetic field intensity and said variation of said second magnetic field intensity.

6. The tire pressure monitoring device of claim 4, wherein said controller is configured to control said tire pressure monitoring device to switch to an operating state when said parameter is greater than a threshold, and to control said tire pressure monitoring device to switch to a sleep state when an average of said parameter in a judging period is less than said threshold.

7. The tire pressure monitoring device of claim 1, further comprising:
   a) a plurality of parameter sensors configured to collect tire parameter information;
   b) a communication circuit configured to transmit said tire parameter information; and
   c) said controller being configured to control said communication circuit to transmit said tire parameter information in a first period in an operating state, and to transmit said tire parameter information in a second period in a sleep state, wherein said first period is less than said second period.

8. The tire pressure monitoring device of claim 7, wherein said controller is configured to control said parameter sensors to collect said tire parameter information in a third period in said operating state, and to collect said tire parameter information in a fourth period in said sleep state, wherein said third period is less than said fourth period.

9. The tire pressure monitoring device of claim 8, wherein said controller is configured to control said communication circuit to transmit said tire parameter information when detecting any abnormal tire parameter information.

10. The tire pressure monitoring device of claim 1, wherein said magnetic sensor is a two-axis anisotropic magneto resistive sensor.

11. A tire pressure monitoring system, comprising the tire pressure monitoring device of claim 1, and being configured to monitor a state of a tire, the system comprising a data processor configured to communicate with said tire pressure monitoring device, wherein said tire pressure monitoring device is installed on a circumferential surface of a corresponding tire at a random angle, such that said first and second directions detected by said magnetic sensor of said tire pressure monitoring device are located on said tangent plane of said circumferential surface.

12. A state control method for a tire pressure monitoring device installed on a circumferential surface of a corresponding tire, the method comprising:
   a) measuring, by a first measuring axis, a first magnetic field intensity in a first direction;
   b) measuring, by a second measuring axis, a second magnetic field intensity in a second direction; and
   c) controlling a state of said tire pressure monitoring device according to a variation of said first magnetic field intensity and a variation of said second magnetic field intensity wherein said first and second magnetic field intensities are measured at a same time and for a certain tire position.

13. The method of claim 12, wherein a predetermined angle between said first and second directions is within a range from 30° to 90°.

14. The method of claim 12, wherein said controlling said state of said tire pressure monitoring device comprises:
   a) obtaining a parameter characterizing variation of a magnetic field intensity in a tire circumferential direction according to said variation of said first magnetic field intensity and said variation of said second magnetic field intensity; and
   b) controlling said state of said tire pressure monitoring device according to said parameter.

15. The method of claim 13, wherein said parameter is the sum of absolute values or the sum of squares of said variation of said first magnetic field intensity and said variation of said second magnetic field intensity.

16. The method of claim 14, wherein said controlling said state of said tire pressure monitoring device according to said parameter comprises:
   a) controlling said tire pressure monitoring device to switch to an operating state when said parameter is greater than a threshold; and
   b) controlling said tire pressure monitoring device to switch to a sleep state when an average of said parameter in a judging period is less than said threshold.

17. The method of claim 13, wherein said first direction and said second direction are two directions with said predetermined angle on a tangent plane of a tire circumferential surface.

18. A non-transitory storage medium having instructions stored thereon that, when executed by a processor, performs the method according to claim 12.

* * * * *